C. E. SHAFFER.
DAM.
APPLICATION FILED JUNE 13, 1916.

1,237,107.

Patented Aug. 14, 1917.
2 SHEETS—SHEET 1.

Witness:
J. P. Wahler
Rohe Meyer

Inventor
C. E. Shaffer
By [signature]
Attorney

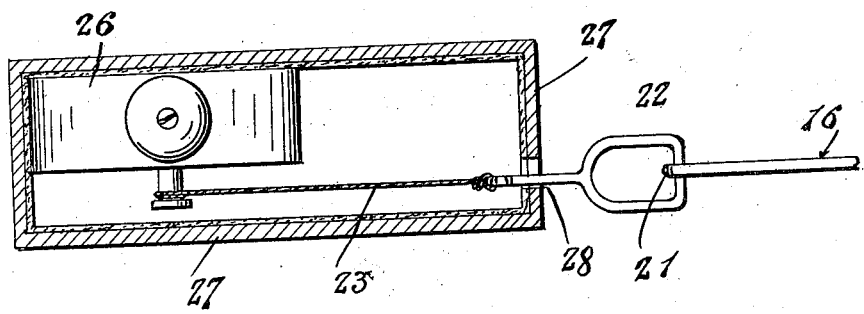
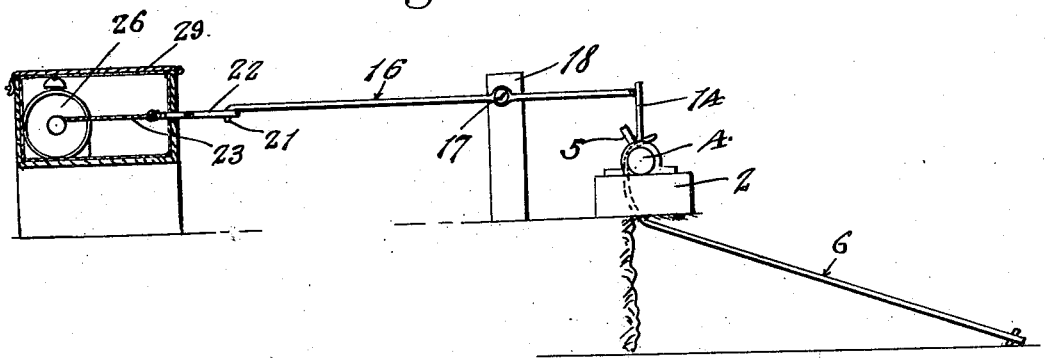
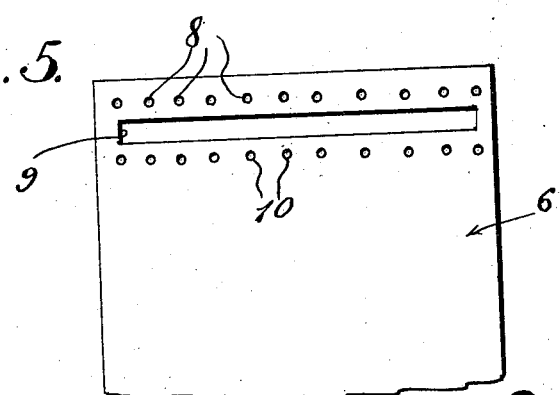

UNITED STATES PATENT OFFICE.

CHARLES E. SHAFFER, OF MORRILL, NEBRASKA.

DAM.

1,237,107. Specification of Letters Patent. Patented Aug. 14, 1917.

Application filed June 13, 1916. Serial No. 103,545.

*To all whom it may concern:*

Be it known that I, CHARLES E. SHAFFER, a citizen of the United States, residing at Morrill, in the county of Scotts Bluff and State of Nebraska, have invented certain new and useful Improvements in Dams; and I do hereby declare the following to be a full, clear, and exact description of the invention, such as will enable others skilled in the art to which it appertains to make and use the same.

This invention relates to dams for irrigation ditches, and the primary object of the invention is to provide a dam which is composed of a sheet of canvas and has its upper end detachably mounted upon pins carried by a rockable pipe, and further to provide a novel trip mechanism adapted to be operated by the alarm of an alarm clock whereby the trip may be released at any predetermined time for permitting the dam to fall to the bottom of the irrigation ditch and permit the water to flow through the ditch.

A further object of this invention is to provide a dam as specified which is constructed with a fold therein so that when it is desired, the length of the dam may be increased for providing a diversion dam which will permit a limited amount of the water to flow through the dam and the ditch.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Fig. 3 is a side elevation of the dam showing parts in section when arranged to form a diversion dam.

Fig. 4 is an enlarged detail of the clock and trip mechanism.

Fig. 5 is a fragmentary view of the dam proper.

Figure 1:
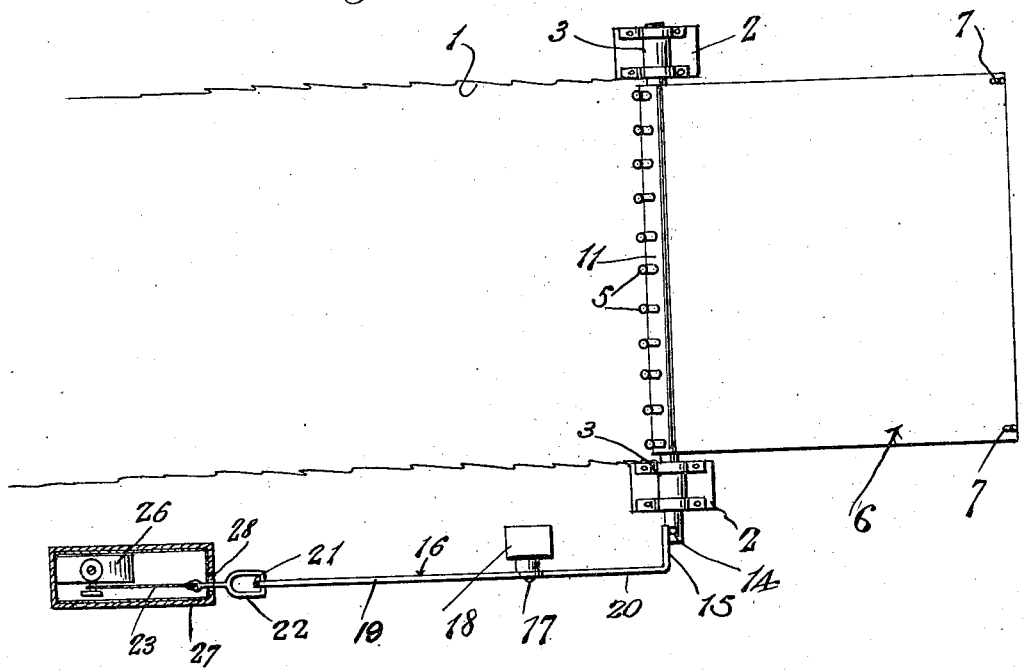
Figure 1 is a top plan view of the improved dam.
Figure 2:
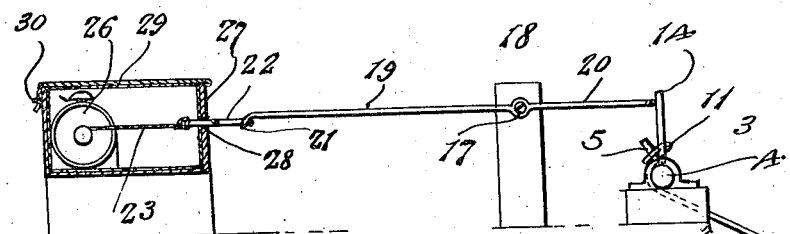
Fig. 2 is a side elevation of the dam showing parts thereof in section.
Figure 6:
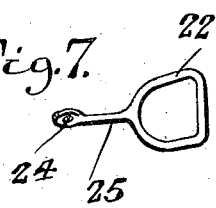
Fig. 6 is a perspective view of a part of the trip mechanism.
Figure 7:
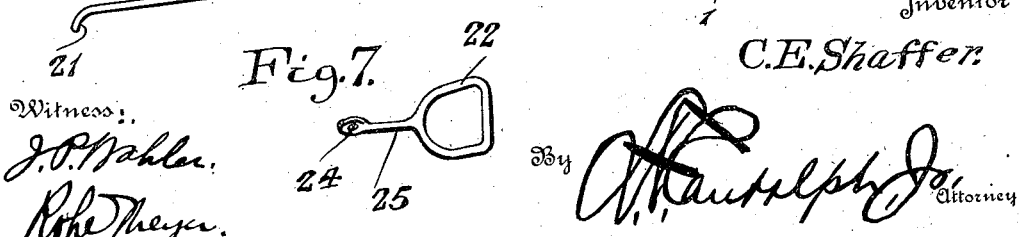
Fig. 7 is a perspective view of the stirrup controlled by the operation of the clock for releasing the tripping lever.

Referring more particularly to the drawings, 1 indicates an irrigation ditch of any ordinary type which has suitable pillow blocks 2 positioned upon the banks thereof directly opposite to each other. The pillow blocks 2 support bearings 3 in which is rockably mounted a rod 4. The rod 4 extends across the ditch 1 and it has a plurality of pins 5 attached thereto and extending rearwardly and upwardly from the perpendicular radii of the rod as clearly shown in Figs. 2 and 3 of the drawings. The dam which is generically indicated by the numeral 6 is composed of canvas or analogous material as is ordinary in the formation of irrigation dams and it has its lower edge pinned or staked to the bottom of the ditch 1 as shown at 7. The upper edge of the canvas dam 6 is provided with a row of spaced openings 8, a laterally extending slot or opening 9 and a second row of spaced openings 10 positioned upon the opposite side of the opening 9 from the row of openings 8. When the dam is used for preventing the flow of water through the ditch 1, the top portion of the dam 6 is folded as shown at 11 in Fig. 2 of the drawings, and the pins 5 are inserted through both of the openings 8 and 10 and when it is desired to provide a dam, which will allow a part of the water to pass through the ditch, the pins 5 are placed through only the top row of openings 8 which allows the upper portion of the dam that is provided with the opening 9 to hang downwardly, so that a part of the water may flow through the opening and onwardly into and through the ditch 1.

A trip pin 14 is attached to and extends perpendicularly from one end of the rockable rod 4. The upper end of the trip pin 14 is engaged by the angled end 15 of a trip rod 16. The trip rod 16 is pivotally mounted as shown at 17 upon a standard 18 and it has its portion 19 which extends rearwardly from the pivot 17 of greater length than the portion 20 which extends forwardly from the pivot 17 and which has the angled end 15 formed thereon so that when the rod is released the end or portion 19 will drop downwardly for moving the angled end 15 out of engagement with the trip pin 14. The terminal of the portion 19 of the rod 16 is curved as shown at 21 and seated in an opening formed in a stirrup 22. The stirrup 22 has a flexible member 23 connected to the eye 24 formed in the shank 25 thereof which flexible member is connected in any suitable way to the alarm shaft of an ordinary alarm clock as indicated at 26 so that when the alarm of the clock is released the flexible member 23 will be wound upon the alarm shaft for moving the stirrup 22 inwardly for releasing the connection between the curved end 21 of the rod 16 and the stirrup 22 which will permit the rod 16 to move upon its pivotal point as previously described. The clock 26 is inclosed in a casing 27, which casing is provided with a slot or opening 28 through which the shank 25 of the stirrup 22 slidably extends. The cover 29 of the box 28 may be hinged thereon and it is preferably held in place by means of set or thumb screws as indicated at 30 and a layer of felt or similar material is mounted about the upper portion of the sides of the casing 27 so as to form a substantially dust and liquid tight joint between the cover 29 and the casing 27.

The operation of the improved dam is as follows: When the alarm of the alarm clock 26 is automatically released in the usual manner, it will wind the flexible member 23 upon the alarm shaft which will move the stirrup 22 inwardly a sufficient distance to release the curved end 21 of the rod 16 from engagement therewith. The end 19 of the rod 16 will then drop downwardly, owing to the fact that it is heavier than the portion 20 thereof, which downward pivotal movement of the end 19 will move the angled end 15 upwardly out of engagement with the trip pin 14. The force of the water against the dam 6 will be sufficient to rock the rod 4 a sufficient distance to permit the upper end of the canvas dam to slip off the pins 5 and drop downwardly into the bottom of the ditch permitting the water to flow through the ditch.

In reducing the invention to practice, certain minor features of construction, combination and arrangement of parts may necessitate alterations to which the patentee is entitled provided such alterations are comprehended within the scope of what is claimed.

What is claimed is:—

1. In an irrigation dam structure, a rod extending transversely across a ditch, a plurality of pins carried by said rod and extending upwardly and rearwardly therefrom, a canvas dam having its lower end secured to the bottom of a ditch, the upper edge of said dam being provided with a plurality of openings for receiving said pins for connecting the upper end of the dam to said rod, said dam having a second set of openings formed therein inwardly of said first named set of openings whereby a fold is formed in the dam when both of said openings receive said rod carried pins, said dam having a slot arranged between the said sets of openings, said first set of openings provided for supporting said dam in a position to permit a flow of water through said slot.

2. In an irrigation dam structure, a rod extending transversely across a ditch, a plurality of pins carried by said rod and extending upwardly and rearwardly therefrom, a canvas dam having its lower end secured to the bottom of a ditch, the upper edge of said dam being provided with a plurality of openings for receiving said pins for connecting the upper end of the dam to said rod, said dam having a second set of openings formed therein inwardly of said first named set of openings whereby a fold is formed in the dam when both of said openings receive said rod carried pins, said dam having a slot arranged between the said sets of openings, said first set of openings provided for supporting said dam in a position to permit a flow of water through said slot, means for holding said rod against rocking movement, and means for automatically releasing said last named means for permitting said rod to rock into a position for allowing the upper end of said dam to slip off said pins.

3. In an irrigation dam structure, the combination, of a rockable rod extending transversely across an irrigation ditch, a plurality of pins carried by and extending upwardly and rearwardly from said rod, a canvas dam having its lower end secured to the bottom of a ditch, said dam provided with a plurality of spaced openings formed near its upper end, said openings adapted for receiving the pins for connecting the upper end of the dam to said rod, a trip pin carried by said rod, a pivotally mounted trip lever having one end angled and the opposite end weighted, said angled end engaging said trip pin for holding said rod against accidental rotary movement, a stirrup detachably connected to the weighted end of said trip lever, and an ordinary alarm clock connected to said stirrup for moving the stirrup out of engagement with the end of said trip lever upon operation of the alarm of the clock, thereby permitting the weighted end of said lever to move downwardly carrying the angled end out of engagement with said trip pin, whereby the force of the water against said dam will rock said first named rod into a position permitting the upper end of the dam to slide therefrom and fall into the bottom of a ditch.

In testimony whereof I affix my signature in presence of two witnesses.

CHARLES E. SHAFFER.

Witnesses:
MARTIN DIRKS,
E. M. LOGAN.

Copies of this patent may be obtained for five cents each, by addressing the "Commissioner of Patents, Washington, D. C."